June 8, 1943. A. H. BOILEAU 2,321,453
PASTEURIZER
Filed Oct. 18, 1940 2 Sheets-Sheet 1
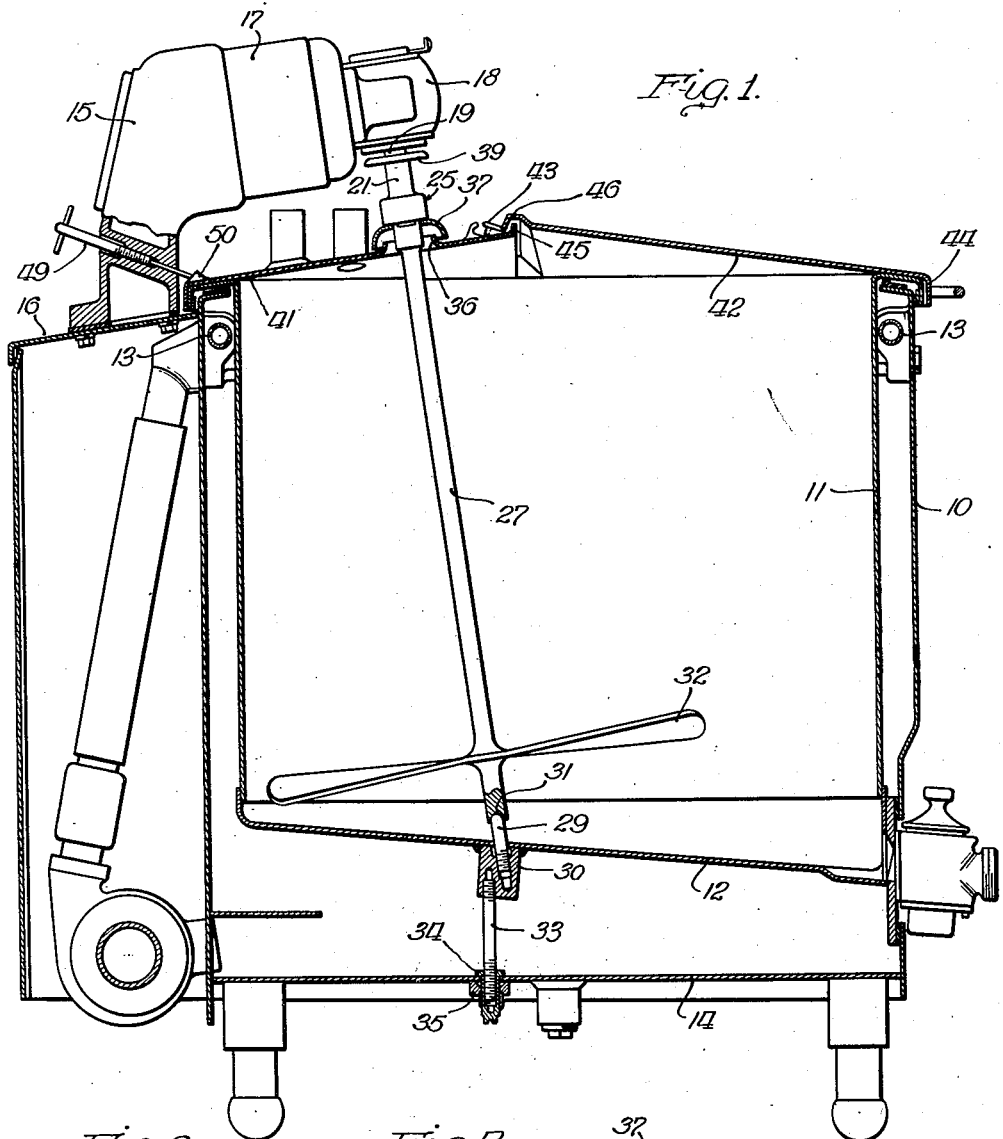
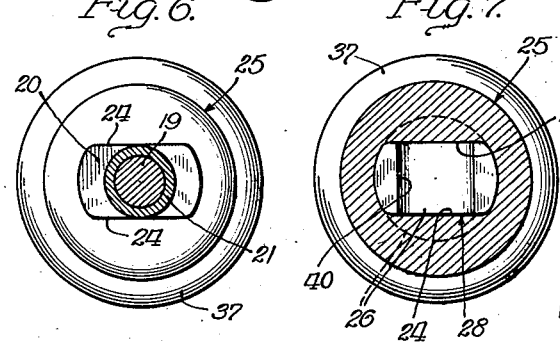
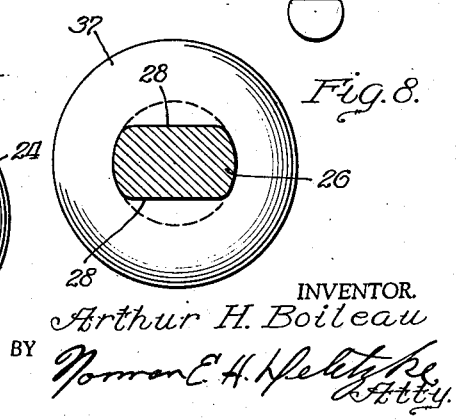
INVENTOR.
Arthur H. Boileau
BY June 8, 1943.  A. H. BOILEAU  2,321,453
PASTEURIZER
Filed Oct. 18, 1940  2 Sheets-Sheet 2
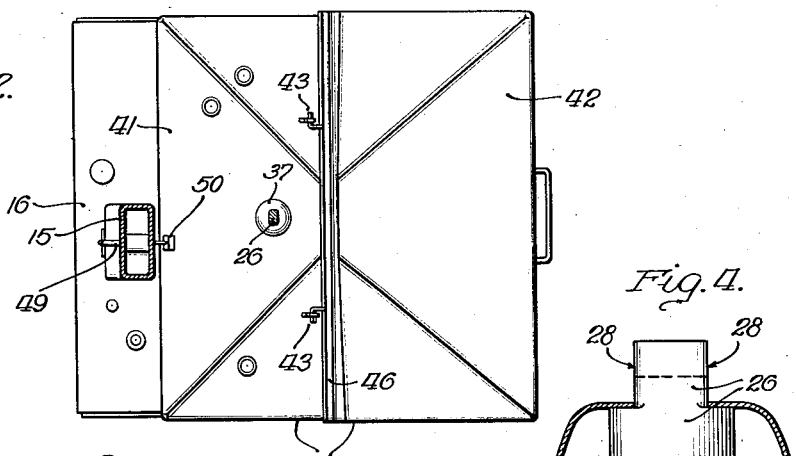
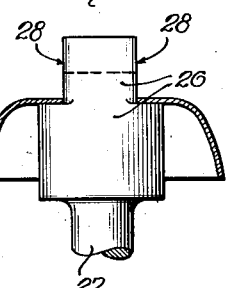
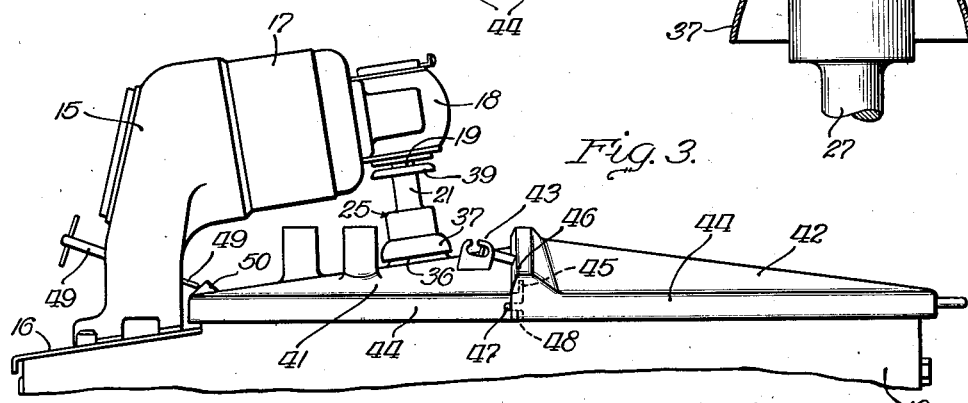
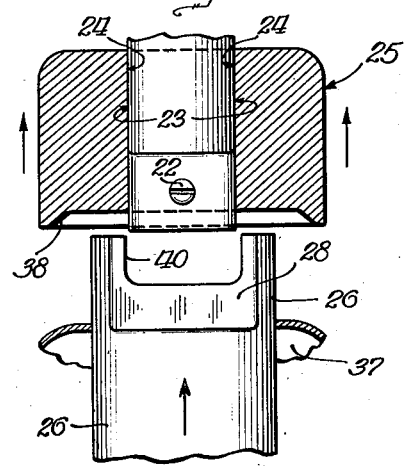
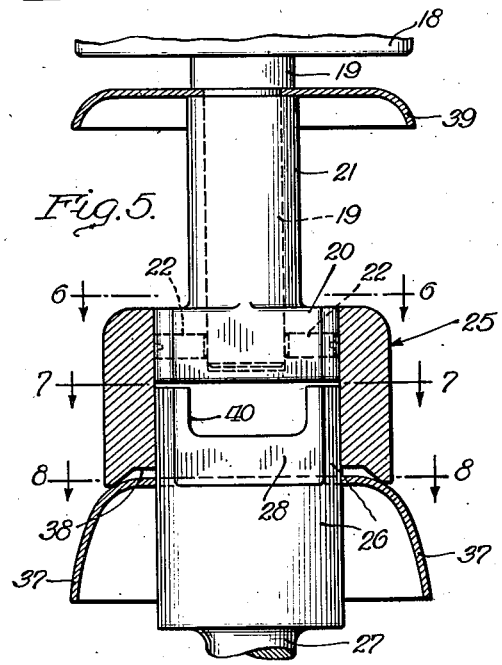
INVENTOR.
Arthur H. Boileau
BY Patented June 8, 1943

2,321,453

UNITED STATES PATENT OFFICE 2,321,453

PASTEURIZER

Arthur H. Boileau, Cedar Rapids, Iowa, assignor to Cherry-Burrell Corporation, Chicago, Ill., a corporation Application October 18, 1940, Serial No. 361,749

7 Claims. (Cl. 259—121)

This invention relates to the construction of apparatus for the processing of materials, such, for example, as liquid dairy products which must be processed in sanitary equipment. More particularly the invention relates to the constructional features of elements of a pasteurizer whereby the ready removal of certain operative elements is made possible, thereby facilitating the frequent necessary cleaning of the apparatus.

In pasteurizing apparatus of the batch type, which comprises the apparatus selected to illustrate the preferred embodiment of the present invention, the batch of liquid dairy product is heated to the desired pasteurizing temperature and "held" or maintained at that temperature in the pasteurizing vat for a predetermined period of time to effect the proper pasteurization thereof. After the substance has been pasteurized it is then cooled to the desired temperature.

The material in the vat is agitated by mechanical means, such, for example, as propellers or paddles, to facilitate the controlled rapid and efficient heating and cooling of the material being processed. Vats of the type contemplated by this invention are usually provided with openable closures to further facilitate the processing of the product whereby the controlled heating and "holding" of the product under sanitary conditions is made more readily possible.

In processing apparatus of the type selected to illustrate the present invention, in which the agitator mechanism is driven by a power unit overhanging the vat proper and in which the vat is provided with a closure, the agitator mechanism does not hang on the power unit but rests on a suitable support, thereby substantially simplifying the necessary structure for satisfactory operation of the agitator. In the present invention such agitator supporting structure, as well as the driving unit and agitator mechanism, is so proportioned and arranged as to permit the ready removal of the agitator from the vat without also moving the driving mechanism from which it receives its power as is common in similar types of pasteurizers now available. The closure mechanism of the vat in sectional and is entirely removable to permit the ready inspection of and greater accessibility to the inside of the vat as distinguished from the present type of closures on similar apparatus in which, if the closure is sectional, it is not entirely removable and, if entirely removable, is not separately removable but is moved with the driving mechanism for the agitator.

The prime objectives of the present invention are to provide a processing apparatus comprising a vat in which is housed a rigidly coupled but removable agitator pivotally supported within the vat and detachably connected to a driving unit overhanging the vat; in which the driving unit is positioned outside of the closure for the vat; in which the agitator shaft which extends through said closure is provided with means to seal the shaft opening through said closure; in which the closure for the vat is comprised of a plurality of sections hinged one to another and having overlapping edges and flanges to completely seal the top of the vat; in which adjustable supporting means is provided to support the weight of the agitator shaft and to prevent the distortion and dislocation of the support for the agitator shaft within the vat when filled with material to be processed; and in which the closure mechanism is so attached to the pasteurizing apparatus as to be readily openable at any time even while the mechanism is in operation but in which the entire closure mechanism may be readily removed from the apparatus, thereby exposing the interior of the processing vat.

The above and other important features of the present invention will be apparent upon the examination of the details of construction and arrangement of the elements of the processing apparatus selected for the purpose of illustration, all of which will be first fully described and then specifically pointed out in the appended claims, reference being made to the accompanying drawings in which:

Figure 1 is a sectional elevation showing the improved arrangement for supporting and coupling the removable agitator, as well as certain improved features of the sectional closure.

Figure 2 is a plan view of the improved processing apparatus with the agitator drive removed.

Figure 3 is an elevational view showing the improved sectional closure and the manner of detachably securing it to the other apparatus.

Figure 4 is an elevational view, partially in section, showing the improved mechanism for sealing the shaft passage through the vat closure.

Figure 5 is an enlarged sectional elevation of the improved coupling in coupled position for joining the ends of the drive mechanism shaft and the abutting ends of the agitator shaft.

Figure 6 is a cross sectional view taken along line 6—6 of Figure 5.

Figure 7 is a cross sectional view taken along line 7—7 of Figure 5.

Figure 8 is a cross sectional view taken along line 8—8 of Figure 5.

Figure 9 is a vertical sectional view similar to that shown in Figure 5 but showing the improved coupling in uncoupled position and the end of the agitator shaft rotated through an angle of ninety degrees relative to the drive shaft to permit the telescoping of the shafts to enable the removal of the agitator shaft from its pivot in the pasteurizing vat.

Referring to the illustrations showing the preferred embodiment of the invention, in which like numerals are associated with like elements, 10 represents the outer vertical wall portions of a casing or enclosure for an open top batch pasteurizer. The pasteurizer is provided with an inner liner having vertical wall portions 11 joined in overlapping relation to the top of the outer casing walls 10 and a liner or vat bottom portion 12 joined to the wall portions 11 to form a vat-like construction or container therewith.

The liner portions 11 and 12 are supported within the casing walls 10 and spaced therefrom to provide room for the heat exchange medium applying mechanism, such as spray pipes 13, positioned between and adjacent to the top portions of the liner wall elements 11 and the casing wall elements 10. A collecting space is provided between the bottom liner portion 12 and the bottom portion 14 of the outer pasteurizer casing or enclosure.

A driving motor support bracket 15 is fixed to the top of a housing 16 fixed to and carried on the rear wall portion of the outer casing 10 of the pasteurizer. A driving motor 17 and gear reducer 18 are supported on the bracket 15 in such a manner as to overhang the open top of the pasteurizer vat.

Extending in a generally downward direction from the gear reducer 18 is a shoulder drive shaft 19. The free end of the shaft 19 is provided with a sleeve 20 having a reduced upper portion 21. The sleeve 20 is keyed to the drive shaft 19 at the lower end thereof by set screws 22. The sleeve 20 is provided with opposed flat faces or power transmitting surfaces 23. The faces 23 are complementary to similar flat faces 24 on the inner surface of the coupling collar 25 which has an elongated opening therein defined on its sides by the flat faces 24 and which is just large enough to permit the ready sliding thereof over the sleeve 20 when the elongated opening in the collar 25 is registered with the sleeve 20 which also has an elongated cross section bounded on its sides by the flat faces 23.

The collar 25 is adapted to jointly overlap the end of the sleeve 20 carried on the drive shaft 19 and the upper end 26 of the agitator shaft 27, thereby operatively coupling the drive shaft 19 and the agitator shaft 27. The upper end 26 of the agitator shaft 27 is of the same diameter as the sleeve 20 and is provided with two complementary opposed power receiving flat faces 28 similar to the opposed pair of flat faces 23 of the sleeve 20.

The upper end 26 of the shaft 27 is also of a size which permits the ready insertion thereof into the elongated opening in the collar 25 when properly registered therewith to provide the driving engagement for the agitator mechanism by the inter-action of the flat power receiving faces 28 with the power transmitting faces 24 of the collar 5 which in turn also engage the complementary flat power transmitting faces 23 of the sleeve 20 keyed to the drive shaft 19. The coupling of the drive shaft 19 through sleeve 20 and collar 25 to the upper end 26 of the agitator shaft 27 by means of the key faces 23, 24 and 28 in the collar 25 and on the abutting ends of the sleeve 20 and the agitator shaft 27 comprises a modified and improved butt-box coupling.

The agitator shaft 27 at its upper end is keyed to and coupled to the drive shaft 19 of the gear reducer 18, and is supported at its lower end upon the pivot 29 which extends through an opening in the bottom portion 12 of the pasteurizer casing. The pivot 29 is mounted in a support block 30 fixed to the bottom portion 12 by any convenient means, such, for example, as by welding. The pivot 29 engages a socket 31 in the lower end of the agitator shaft 27 whereby the shaft 27 is supported and centered when in operative position.

The agitator shaft 27 and its agitator 32, when combined with the weight of the product to be treated in the pasteurizer, may be sufficient to tend to depress the vat bottom portion 12. In order to prevent such possible depression of the vat bottom portion 12, which may also permit the agitator shaft to become disengaged from the butt-box driving coupling or the agitator supporting pivot 29, the support block 30 is braced against the more rigid pasteurizer casing bottom 14 by a bracing and supporting element 33. The bracing and supporting element 33 engages the support block 30 by a ball and socket arrangement.

The lower end of the bracing element 33 is threaded into a sleeve 34 swiveled in an opening in the casing bottom 14 whereby the bracing element 33 and in turn the support block 30 are braced against and supported on the rigid casing bottom 14. The swiveled sleeve 34 is threaded on its outer surface to engage a lock nut 35 adapted to lock the sleeve 33 in position in order to permit the maintenance of any desired setting of the support and bracing element 33.

As clearly disclosed in Figure 1 and also in the enlarged view of the butt-box coupling in Figure 2, which coupling joins the abutting ends of the agitator shaft 27 and the drive shaft 19, the shaft 27 is locked against axial motion by the engagement of the lower end of the shaft with the supporting pivot 29 and the engagement of the upper end of the agitator shaft with the drive shaft 19 when the shafts are in coupled position. However, the removal of the agitator shaft 27 and the agitator 32 from the processing vat formed by the elements 11 and 12 is desirable to permit the ready cleaning and inspection of the vat and the agitator. Accordingly, the butt-box coupling formed by the collar 25 and the abutting keyed ends of the shafts 19 and 27 have been uniquely designed to prevent relative axial motion between the shafts 19 and 27 when the collar 25 is removed from coupling position, such motion being sufficient to permit the disengagement of the socket 31 in the lower end of the shaft 27 from the supporting pivot 29.

In order to permit the axial motion of the shaft 27 relative to the fixed shaft 19, which normally is not possible due to the end-to-end engagement of these shafts, the upper end 26 of the shaft 27, which has an elongated cross section similar to the collar 20, has been provided with a centrally positioned transverse keyway or groove 40 which extends at a right angle to the flat faces 28 and is of a width slightly greater than the width of the sleeve 20 between the flat faces 23.

The shaft 27 may be rotated on its pivot 29 independently of the drive shaft 19 when the collar 25 has been disengaged from the end 26 of the shaft 27 by raising the collar 25, as indicated in Figure 9. By rotating the shaft through an angle of approximately ninety degrees relative to the shaft 19, the groove or keyway 40 will be brought into registery with the end of the sleeve 20 so that the end of the sleeve 20 may be telescoped into the keyway 40. The keyway 40 is of a sufficient depth to permit sufficient telescoping of the shafts 27 and 19 so that the socket 31 may be disengaged from the pivot 29.

When the socket 31 has been disengaged from the pivot 29, the lower end of the shaft 27 may be moved slightly sidewardly and then the shaft may be lowered a sufficient distance to permit the withdrawal of the upper end thereof downwardly through the passageway in the vat closure. The agitator mechanism, having thus been disengaged from the supporting pivot and driving coupling, may then be easily removed from the pasteurizing vat. When the shaft 27 has been removed from the coupling position, the collar 25 may again be slid down over the sleeve 20 until the inversely cupped bottom portion 38 thereof engages the upper portion of the guard bell 37, thereby effectively closing the shaft passage in the vat closure.

The shaft 27 extends through an opening in the rear section of the sectional closure for the pasteurizer. The opening is surrounded by an upwardly turned flange 36 which prevents liquid which may be draining over the closure adjacent the opening for the shaft 27 from entering therethrough into the pasteurizer vat. The upturned flange 36 also co-acts with the overlapping bell-shaped guard 37 which is provided in its upper portion with an elongated opening similar to the opening in the collar 25 and is telescoped over the end 26 of the shaft 27 to be supported thereon by engaging the larger diametered portion of the shaft 27 adjacent the lower extremities of the flat faces 28 positioned on opposite sides of the end 26 of the shaft 27.

The bell-shaped guard 37 has a slightly larger inner diameter at its lower opening than the outer diameter of the flange 36, and, when mounted in operative position upon the shaft 27, overlaps the flange 36 to constitute a shield which prevents foreign matter from entering the opening for the shaft 27 in the vat closure. The collar 25, when in operative position, rests on the top portion of the guard or bell 37. The collar 25 is provided in its lower face with an inverted cup-like surface 38 so as to slightly overlap the upper portion of the bell-like guard 37 both transversely and axially when resting upon it to thereby seal the opening in the top of the bell-like closure 37.

A guard bell 39 is supported between a shoulder on the shaft 19 and the upper end of the sleeve 21 to prevent the draining of the condensate from the gear reducer 18 down onto the sleeve 20 or the draining of the lubricant from the gear reducer 18 down onto the sleeve 20 and thence possibly through the butt-box coupling formed by the sleeve 20 and collar 25 onto the shaft 27 from which it may then flow into the pasteurizer vat. The guard 39, as shown, is of sufficient diameter to overlap the collar 25 and, when mounted as described, prevents the draining of condensate or lubricant into the collar 25.

The open top pasteurizing vat is covered by a removable sectional closure, as particularly illustrated in Figures 1, 2 and 3. The closure is comprised of two sections 41 and 42, each covering approximately half of the vat opening and joined along their overlapping edges by hinges 43. Each section 41 and 42 is comprised of a single sheet provided with break lines along which the metal sheets have been bent to form adjoining triangular portions of each section. Each triangular portion is inclined downwardly from the portion of the sectional closure overlapping the center of the vat toward the edge of the vat. Each section of the sectional closure is provided at its outer edge with a depending flange 44 which overlaps the outer upper portion of the walls 10 of the pasteurizer casing. Both sections 41 and 42 of the sectional closure are provided along their adjacent edges with co-acting flanges to effectively close a line of juncture between the sections of the closure. The rear section 41 is provided with an upwardly turned flange 45 along its front edge which is overlapped by an inverted, substantially truncated, V-shaped flange 46 along the rear edge of the front section 42 of the sectional closure.

The front section 42 is pivoted by hinges 43 upon the rear section 41 approximately along the line of overlapping flanges 45 and 46. The hinges joining the sections 42 and 41 are so constructed that, when the section 42 is raised to an approximately vertical position, the hinges may be readily disengaged by lifting the section 42 vertically whereby the section 42 may be entirely removed from the processing apparatus. Section 41 of the sectional closure is removably locked to the upper rear portion of the pasteurizing apparatus by the engagement of two studs 47 with complementary means in flange 44 of section 41. The studs 47 are positioned on the outer upper central portions of the opposed side walls 10 of the pasteurizer casing at the point normally overlapped by the front extremities of the depending flange 44 of the rear sectional closure 41.

The front extremities of the flange 44 of the rear sectional closure 41 are provided with rearwardly extending slots 48 for the engagement of the studs 47. The slots 48 in the studs 47 are maintained in engagement by the pressure applied by the compression screw 49 which is threaded through the bracket 15 against the compression block 50 positioned on the rear central upper surface of the rear closure section 41.

Screw 49 is disposed at an angle to the surface of the closure 41 and exerts a forwardly directed pressure upon the block 50. By forcing the screw 49 into engagement with the compression block 50 the rear section 41 of the vat closure is forced downwardly and forwardly to engage the slots 48 with the studs 47 and to engage the rear portion of the depending flange 44 of the section 41 with the complementary upper portion of the rear casing wall 10, as well as to force the main portion of the outer edge of the section 41 into engagement with the portion of the vat wall 11 which overlaps the outer casing wall 10. In order to remove the section 41 from the pasteurizing apparatus it is only necessary to loosen the screw 49 to disengage it from the compression block 50 and, after the agitator shaft 27 has been withdrawn through the opening in the section 41 through which it passes, the rear portion of the section 41 may be pivoted upwardly on the studs 47 and then drawn slightly rearwardly to disengage the studs 47 from the slots 48 whereupon the section 41 may then be completely removed from the pasteurizing apparatus.

In the preferred embodiment of the present invention, which has just been described, a processing apparatus equipped with an outer driving mechanism overhanging the open top pasteurizer has been provided with a completely removable sectional closure in which the agitator element adapted for agitating the material in the vat is driven by a shaft extending through a portion of the sectional closure and disengageably coupled to the overhanging driving unit; in which the agitator coupling member has been provided with inter-cooperating elements to effectively seal the opening in the sectional closure through which the agitator drive shaft passes either when the drive shaft is in operative position or when the drive shaft has been removed from the agitator; in which the agitator for the processing apparatus is readily removable from the inside of the vat; in which the drive shaft is positioned by an adjustably supported pivot within the vat adjustable from the outside of the vat without providing an opening through the vat; in which one section of the completely removable sectional closure is detachably locked into operative position upon the pasteurizing apparatus to which section of the sectional closure the remaining section is removably hinged; in which the sections of the closure are provided with overlapping and depending flanges to completely seal the open top vat when the sectional closure is in closing position; and in which the lines of juncture between the several sections of the closure are provided with inter-cooperating elements to effectively close the space normally unprotected along a line of juncture of independently movable elements of a closure.

The preceding description of the present invention relates to the preferred embodiment thereof. However, it is to be understood that various modifications thereof may readily be made without departing from the spirit of the invention. Accordingly, the invention is intended to be interpreted in keeping with the spirit of the specification and the appended claims.

The invention is hereby claimed as follows:

1. In a device of the type described, an open top vat, a closure for said open top, a shaft opening through said closure, a power unit having a drive shaft positioned outside of said vat for actuation of an agitator element within said vat, an agitator drive shaft extending through said shaft opening and coupled to said drive shaft and abutting thereagainst when coupled in operative position, said abutting relation supporting said shaft against vertical upward motion when in operative position, a collared butt-box coupling connecting said shafts, a pivot for the other end of said agitator shaft positioned inside of said vat, and means on the abutting ends of one of said shafts to permit said shafts to be moved axially relative to one another when said collar is removed from said butt-box coupling and when said abutting shafts have been rotated relative to one another to disengage said abutting portions, whereby said agitator shaft may be removed from said shaft pivot and axial thrust support provided when said shafts are coupled together for operation.

2. In a device of the class described, a driving member having a coupling end, a driven member having a coupling end connectable with the coupling end of said driving member, and a coupling means connecting said coupling ends of said driving and driven members, one of said coupling ends being provided with a depression capable of telescopically receiving the other coupling end when said coupling ends are uncoupled and said depression is placed in registry with said other coupling end.

3. In a device of the class described having an agitator drive shaft and a driven agitator shaft, a collared butt-box coupling joining the abutting ends of said shafts, a keyway in the abutting end of one of said shafts, whereby when said collar is removed from said coupling said keyway may be registered with the abutting end of the other of said shafts to receive the same thereinto, thereby permitting relative axial motion between said shafts.

4. In a device of the type described, an open top vat, a sectional closure for said open top, hinges joining the sections of said sectional closure, complementary gripping means carried by one of the sections of said sectional closure and by said vat, a bracket on said vat, and means carried by said bracket for releasably engaging said last mentioned section of said closure for maintaining said complementary gripping means in engagement and for compressing said last mentioned section against said vat.

5. In a device of the class described, a vat, an apertured closure for said vat, a pivot in said vat, an agitator pivoted within said vat, an agitator drive having a driving shaft positioned above said closure, an agitator drive shaft extending through the aperture in said closure and coupled to and abutting said driving shaft, said abutting relation supporting said shaft against vertical upward motion when in operative position, a butt-box coupling joining the abutting ends of said shafts, and adjustable support means for adjusting the position of said pivot with respect to said driving shaft, whereby the space intermediate said driving shaft and said pivot may be adjusted to the length of said agitator drive shaft and axial thrust support provided when said shafts are coupled together for operation.

6. In a device of the type described, a vat, a closure for said vat having a passageway therethrough, an agitator drive element positioned outside of said closure, an agitator within said vat having a drive shaft extending through said passageway into position to be detachably coupled to said drive element and to abut thereagainst to provide axial thrust support for said drive shaft when coupled to said drive element, said agitator drive shaft being adapted to be moved inside of said vat when uncoupled from said drive element, a guard element for said passageway which is detachably carried by said agitator drive shaft above said passageway, said guard ring being adapted to be detached from said drive shaft when it is withdrawn from said passageway and also being adapted to be supported over said passageway on said closure, and a detachable coupling element for coupling said drive shaft and said drive element when said drive shaft is in coupling position, said coupling element being adapted to co-act with said guard ring and said drive element when said drive shaft is withdrawn from the passageway in said closure for completely sealing said passageway.

7. A device of the type described comprising, in combination, a vat having an open top normally closed by a ported closure, an agitator drive element outside of said closure and alined with the port in said closure, an agitator drive shaft extending through the port in said closure into said vat and abutting against the end of said drive element to provide axial thrust support for said drive shaft, a drive shaft pivot secured to the vat within said vat, and pivot adjusting means outside of said vat, whereby upon the adjustment of said pivot adjusting means a portion of said vat is deflected to effect an adjustment of said drive shaft pivot.

ARTHUR H. BOILEAU.